April 12, 1938.  A. J. MARION  2,113,850
AUTOMOBILE LIGHTING EQUIPMENT
Filed Nov. 24, 1936
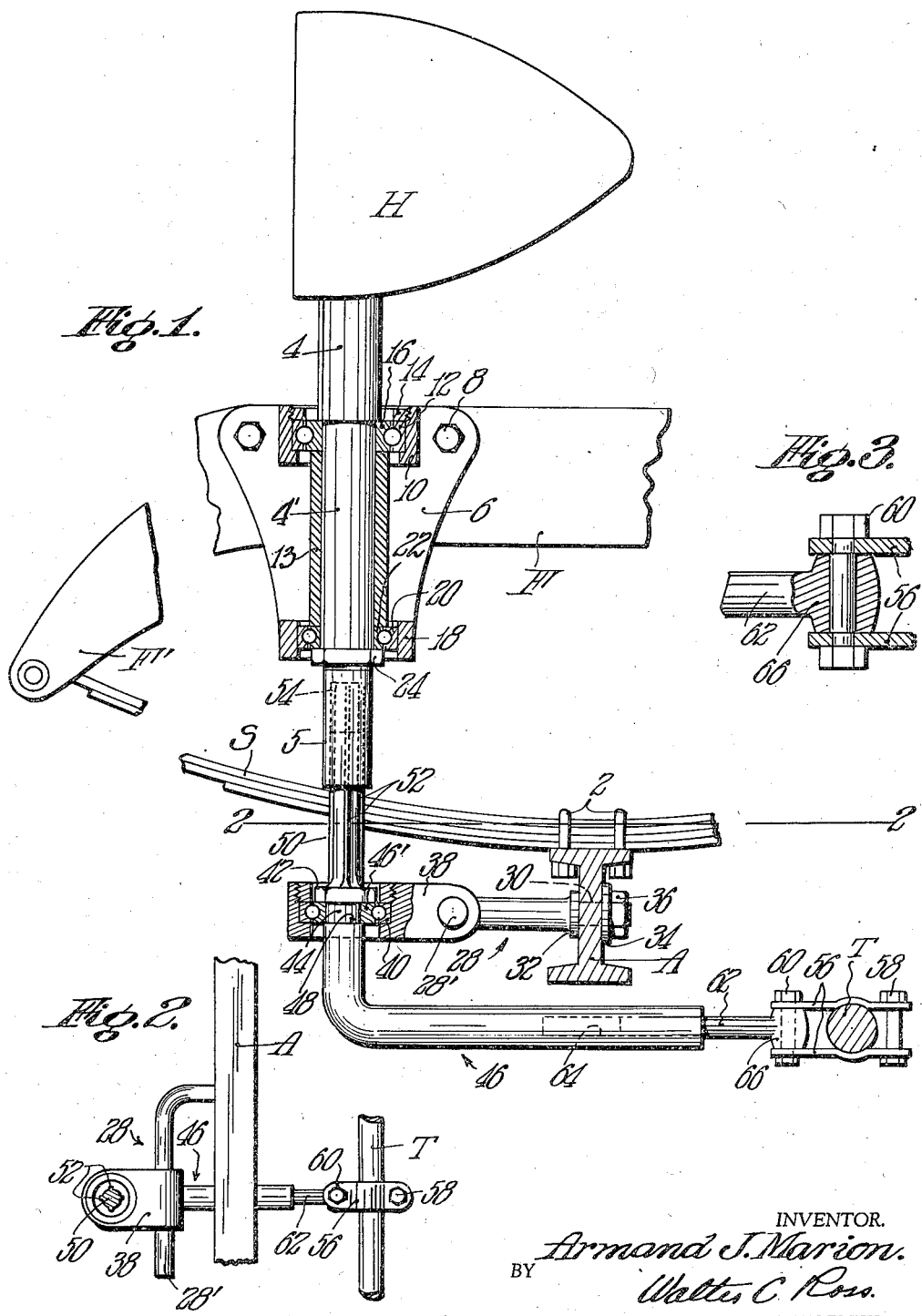
INVENTOR.
Armand J. Marion.
BY Walter C. Ross
ATTORNEY.

Patented Apr. 12, 1938

2,113,850

UNITED STATES PATENT OFFICE 2,113,850

AUTOMOBILE LIGHTING EQUIPMENT

Armand J. Marion, Huntington, Mass.

Application November 24, 1936, Serial No. 112,454

1 Claim. (Cl. 240—62.72)

My invention relates to improvements in automobile lighting equipment, the special objects of the improvement being, first, to provide the night-driving motorist with satisfactory and sufficient light on the road directly in front of him at all times regardless of how short or abrupt the turn or corner may be, and second, to provide additional and necessary protection to the pedestrian moving on state highways, country roads, private driveways, alleys, etc., by providing the motorist with direct, necessary and sufficient light on turns and corners; and the mechanical features of the improvement are, to provide a device by which the left headlight, or the right headlight, or both the left and right headlights, or a left independent auxiliary light, or a right independent auxiliary light, or left and right independent auxiliary lights, for the purpose of providing direct light in the exact and continuous path of the progressive motion of an automobile as to include each movement to the right or left as directed by the driver with the steering mechanism and accomplished or carried out by the movement of the front wheels.

The objects of the invention are attained by the novel combination and arrangement of parts hereinafter more fully described in connection with the accompanying drawing, wherein:

Fig. 1 is a side elevational view of the mechanism of the invention associated with the forward portion of a vehicle frame, with parts in section for clearness;

Fig. 2 is a small scale plan view on the line 2—2 of Fig. 1; and

Fig. 3 is a partial sectional elevational view of the rod-clamping means.

Referring now to the drawing more in detail the invention will be fully described.

The forward end of a side of an automobile frame is represented by F. To the forward end F' of said frame there is connected one end of a spring S that is secured to an axle A by U bolts 2. The frame and axle are movable towards and away from one another as is usual. A tie rod T represents the usual rod of the steering mechanism of an automobile which moves back and forth more or less parallel to the axle as the steering mechanism is operated to move the wheels in one direction or the other.

A headlight is represented at H depending from which is a post 4. A bracket 6 is secured, as by bolts 8, to the frame F. An upper bearing part 10 of the bracket 6 has the outer race 12 of a ball bearing held therein by a collar or ring 14, as shown, and an inner race 16 of the bearing receives a reduced part 4' of the post, all as shown.

A lower bearing 18 of bracket 6 has an outer race 20 of a ball bearing fixed therein, and an inner race 22 of said bearing receives the said reduced post part 4'. A nut 24 on the post abuts the bearing, as shown, to hold the post against upward movement whilst the said post is rotatable in bracket 6 by means of the bearings shown and described. A spacer such as 13 is preferably provided to keep part 16 the correct distance from bearing post 22.

A bar 28 has an end 30 portion pivotally mounted in axle A, there preferably being an enlarged part 32 thereof at one side of the axle and a washer 34 and nut 36 at its other side. A block 38 is carried by a part 28' of bar 28 and in this is mounted an outer race 40 of a ball bearing. Inner race 46' of the ball bearing receives a vertically disposed part 44 of an arm 46. There is a shoulder 48 on said part 44 below the ball race 46', and a nut 42 above said race all as shown.

An extension 50 of the arm 46 is vertically disposed and provided with keys 52 and the said extension is slidably received in a socket 54 provided in a lower end portion 5 of post 4, the said socket 54 having splines cooperating with the keys 52. This is so that as the frame F and axle A are moved towards and away from one another the extension 50 may slide in the socket whilst a rotative movement of said extension will bring about rotation of the post 4.

Clamp plates 56, having seats as shown for receiving opposite sides of tie rod T, are held in clamping relation on the said rod T by a bolt 58 and shoulder screw 60. A pin 62 has its forward end slidable in a socket 64 of arm 46 and a rear end portion 66 of said pin receives the screw 60 of the clamps, as shown in Fig. 3, so as to be oscillatable thereon. As rod T moves back and forth the arm 46 is swung back and forth by pin 62.

In operation as rod T moves back and forth as it will when the steering mechanism is operated to move the automobile wheels, the arm 46 is swung in one direction or the other by pin 62. The post 4 is rotated from arm 46 by means of the extension 50 in the socket of the said post. As the frame and axle move towards and away from one another the extension 50 slides in the socket 54 of the post without disturbing the driving connection between the said post and extension.

I claim:

The combination of a vehicle having a frame movable up and down relative to an axle and a tie rod movable longitudinally of the axle with means for supporting and oscillating a headlight as the tie rod moves comprising, a bracket on the frame having a vertical bore, a headlight post oscillatable in said bore, a clamp member secured to said tie rod, a rod forwardly of the axle substantially parallel therewith having a part pivoted in the axle, a block on the rod having a vertical bore, a pin having its rear end pivoted in the clamp, an arm slidably engaging the pin having an upstanding part oscillatable in the block, and slidable and relatively non-rotatable connections between the post and upstanding part of the arm.

ARMAND J. MARION.